Figure 5:
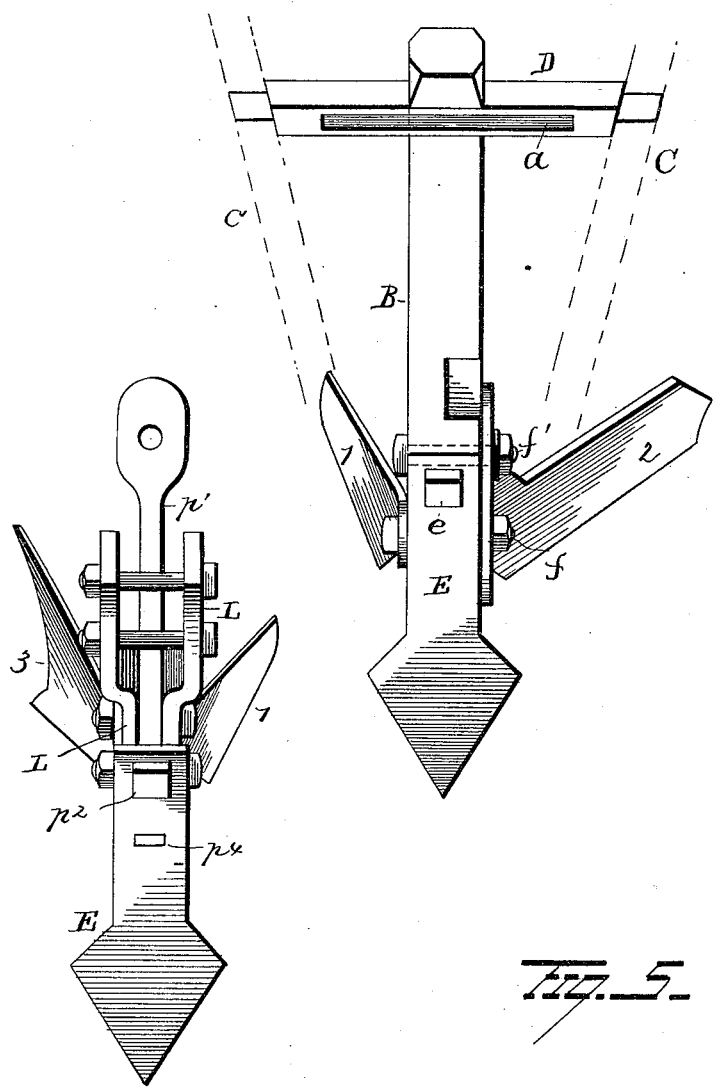

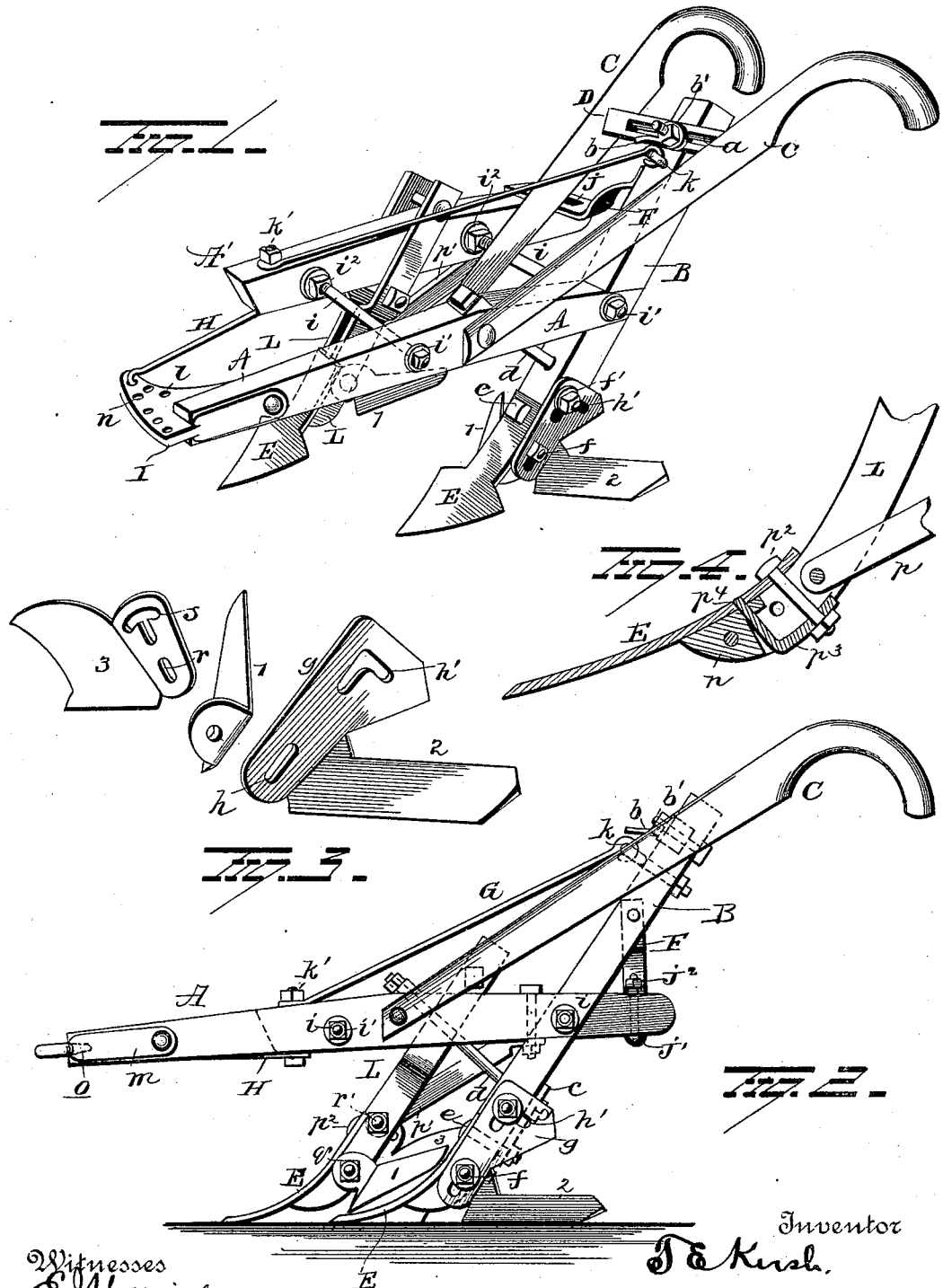

(No Model.) 2 Sheets—Sheet 2.

T. E. KERSH.
SHOVEL PLOW.

No. 466,060. Patented Dec. 29, 1891.

Witnesses
G. F. Nottingham
S. G. Nottingham

Inventor
T. E. Kersh.

By his Attorney
H. A. Simmon.

UNITED STATES PATENT OFFICE.

THOMAS E. KERSH, OF PALESTINE, TEXAS.

SHOVEL-PLOW.

SPECIFICATION forming part of Letters Patent No. 466,060, dated December 29, 1891.

Application filed September 9, 1890. Serial No. 364,412. (No model.)

*To all whom it may concern:*

Be it known that I, THOMAS E. KERSH, a citizen of the United States, residing at Palestine, in the county of Anderson and State of Texas, have invented certain new and useful Improvements in Shovel-Plows; and I do hereby declare the following to be a full, clear, and exact description of the invention, such as will enable others skilled in the art to which it appertains to make and use the same.

My invention relates to an improvement in shovel plows and sweeps or cultivators, the object of the invention being to provide an implement which may be used as an ordinary shovel plow or cultivator.

A further object is to so construct and arrange the several parts of the device that they may be easily and quickly adjusted to adapt the implement to different kinds of work.

A further object is to produce a shovel plow or cultivator which shall be simple and durable in construction, easy of adjustment, and comparatively cheap to manufacture.

With these objects in view the invention consists in certain novel features of construction and combinations and arrangements of parts, as hereinafter set forth, and pointed out in the claims.

In the accompanying drawings, Figure 1 is a perspective view. Fig. 2 is a side view. Figs. 3, 4, and 5 are views of details.

A represents a plow-beam secured at its rear end to an inclined stock B, and secured to the beam at points in advance of the stock B are the forward ends of handles C. The handles are connected at points near the upper end of the stock by means of a cross-bar D, having an elongated slot $a$, which bar is adapted to pass loosely through a notch made near the upper end of the stock. Passing through this slot and through a perforation in the stock B is a bolt having a head adapted to bear on the rear face of the stock B, and provided at its other end with screw-threads for the reception of a set-screw $b$, a washer $b'$ being interposed between said set-screw and the cross-bar D. By this means the position of the handles relatively to the plow-stock may be adjusted, thereby regulating the draft of the plow under different circumstances, as hereinafter explained.

Located on the rear face of the stock and at the lower end thereof is a plate or washer $c$, which tends to strengthen the stock and at the same time serves as a washer for the heads or nuts on the lower ends of two rods or bolts $d\ e$, the rod $d$ being passed upwardly through the stock and a perforation in the beam A, and provided at its upper end with a nut, whereby the beam and stock are rigidly secured together. The rod or bolt $e$ is provided at its upper end with a head which serves to secure a shovel E to the stock, said shovel being preferably arrow-shaped and adapted to extend some distance beyond the lower end of the stock.

The stock B is provided at points near its lower end with transverse perforations for the accommodation of bolts $f\ f'$, by means of which the sweeps are secured to the stock. The sweep 1 is in general form V-shaped and of rather short length, its front edge being slightly curved and sharpened. The inner end of the sweep 1 is bent upwardly and provided with a perforation for the accommodation of the bolt $f$, by means of which it is secured usually to the inner side face of the stock and may be adjusted at any desired angle to the ground by turning it on the bolt $f$. The sweep 2 is usually secured to the outer side face of the stock and comprises a comparatively long rectangular blade slightly curved or dished and an arm $g$, by which it is secured to the stock. The arm $g$ is provided with an elongated slot $h$ for the reception of the end of bolt $f$ and an L-shaped slot $h'$ for the reception of the bolt $f'$. By this arrangement of slots the sweep 2 may be secured to the stock B at any desired adjustment.

The stock and beam of the plow are provided with perforations for the reception of rods $i$, having screw-threads at each end and secured at any desired adjustment to the beam and stock by means of nuts $i'$. The outer ends of the rods $i$ are adapted to pass through perforations in a supplemental beam A' and adjustably secured thereto at any desired distance from the main beam A by means of nuts $i^2$. A metallic brace F is secured at one end to the stock or standard B by means of a suitable bolt and at the other end is provided with an elongated slot $j$ for the reception of a bolt $j'$, passed through the supplemental beam $A'$, a nut $j^2$ being placed on said bolt to secure the brace in place and the elongated slot permitting the adjustment of the supplemental beam relatively to the main beam. At a point on the stock or standard B slightly below the cross-bar D an eye $k$ is secured, adapted to receive the upper hooked end of a brace-rod G, the other end of which is connected to a bolt $k'$, passing through the forward end of the supplemental beam $A'$. To the lower end of the bolt $k'$ another brace-rod H is secured, the forward end of which is hook-shaped and adapted to be inserted in one of a series of perforations $l$ in a clevis I, secured to the forward end of the main beam A. By thus connecting the supplemental beam to the main beam it may be adjusted relatively thereto as desired. The clevis I is provided with two rearwardly-extending arms $m$, having perforations near their rear ends for the reception of a bolt, by means of which they are secured to the beam and may be disposed at right angles to the position shown in the drawings, if desired.

The clevis is provided with the usual perforations $n$, and projecting from the forward portion of the clevis and adapted to enter a socket in the forward end of the beam A is a projection $o$, by means of which the clevis is prevented from vertical or lateral movement.

Secured to the supplemental beam $A'$ is a stock L, composed of two metallic plates properly spaced at their free lower ends by means of a spacing-block $p$ and braced by an arm $p'$. A shovel E is secured to the stock L by means of a bolt $p^2$, to the lower end of which is secured by means of a nut a plate $p^3$, which is bent upwardly and adapted to pass through a perforation $p^4$ in the shovel. To the inner side face of the stock L a sweep 1 is secured by means of a bolt $q$, the other end of said bolt serving to secure a sweep 3 to the outer face of the stock L. This sweep 3 is provided with an elongated slot $r$ for the accommodation of bolt $q$, and an L-shaped slot $s$ for the reception of a bolt $r'$. By this means the sweep 3 may be readily adjusted to any desired depth, said sweep 3 being preferably made in a form similar to the mold-board of an ordinary turn-plow.

From the construction of the device, as above set forth, it will be seen that the sweeps are so constructed as to admit of being "missmated"—that is to say, sweep 1 can be used in connection with 2, or 2 can be mated with sweep 3 or the sweep 3 with sweep 1, as the case may require.

When the device is used as a cultivator and it is desired that the middles between the drills shall be covered heavily and at the same time that the drill shall be only lightly "dirted," sweep 1 will be used on one side of the stock and sweep 2 or 3 on the other. It will be seen that the lower the sweeps are worked on the plow-stocks the shallower the plow or shovel will penetrate the soil. By this means the weeds and grass may be killed and the roots of the growing crops saved from being torn up and cut off. When it is desired to use more than one single shovel-plow, the supplemental beam may be removed and have suitable handles attached thereto, in which case the metallic stock L will be moved near the rear end of the beam. When the sweeps shall have been secured to place in the desired arrangements, the draft is liable to be unequal; but by adjusting the cross-bar D relatively to the stock B and attaching the team to the clevis in one or another of the perforations the draft of the device may be easily and quickly equalized.

Many slight changes in the details of construction of my invention might be made without departing from the spirit thereof or limiting its scope. Hence I do not wish to confine myself to the precise details of construction herein set forth; but, Having fully described my invention, what I claim as new, and desire to secure by Letters Patent, is—

1. In a plow, the combination, with a beam, a stock extending above and below said beam, and handles secured to the beam and connected with the upper end of the stock, of a plate $g$, secured to one side of the stock at or near its lower end, a rod passing through the beam and stock and having a head adapted to bear on said plate, a shovel secured to the stock by means of a bolt, and a nut on said bolt adapted to bear on the plate on the stock, substantially as set forth.

2. The combination, with the stock of a plow, of a shovel secured thereto, a short pointed sweep having a single bolt-hole secured to the stock at one side thereof, and a sweep secured to the other side of said stock, said last-mentioned sweep being provided with an elongated slot and an L-shaped slot, substantially as set forth.

3. The combination, with a plow beam and stock, the latter having a notch near its upper end, of a pair of handles connected with the beam, a cross-bar connecting said handles and adapted to have a sliding movement in said notch, said cross-bar being provided with an elongated slot, a set-screw passing through the stock and cross-bar, a clevis at the forward end of the beam, a supplemental beam, means connecting the forward end of the supplemental beam to the clevis, and a rod connecting said supplemental beam to the stock, substantially as set forth.

4. The combination, with a plow, of a supplemental beam adjustably secured thereto, a brace secured at one end to the stock of the plow and at the other end adjustably secured to the supplemental beam near the rear of the latter, and a rod extending from a point near the forward end of the supplemental beam to the stock, substantially as set forth.

5. The combination, with a plow and a main beam and stock, of a supplemental beam and stock adjustably secured thereto, a rod connecting the supplemental beam and main stock, a clevis connected to the beam of the plow and provided with two series of perforations, and a rod connecting the forward end of the supplemental beam with a perforation of one of the series of perforations in the clevis, substantially as set forth.

6. The combination, with a plow, of a series of screw-rods adjustably connected thereto and projecting laterally therefrom, a supplemental beam adjustably secured to said rods, a stock secured to the supplemental beam, an adjustable brace-rod connecting the stock of the plow with the rear end of the supplemental beam, a rod secured at one end to the forward end of the supplemental beam and at the other end adjustably connected with the stock of the plow, a clevis on the main beam of the plow, and a rod connecting the forward end of the supplemental beam with said clevis, substantially as set forth.

In testimony whereof I have signed this specification in the presence of two subscribing witnesses.

THOMAS E. KERSH.

Witnesses:
V. F. DUBOSE,
V. L. VESEY.